(12) United States Patent
Suetake (10) Patent No.: US 7,634,593 B2
(45) Date of Patent: Dec. 15, 2009

(54) SYSTEM AND METHOD FOR DMA TRANSFER

(75) Inventor: Seiji Suetake, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 220 days.

(21) Appl. No.: 11/165,244

(22) Filed: Jun. 24, 2005

(65) Prior Publication Data

US 2006/0206633 A1      Sep. 14, 2006

(30) Foreign Application Priority Data

Mar. 8, 2005   (JP)   ............................ 2005-064358

(51) Int. Cl.
*G06F 13/00*   (2006.01)
*G06F 13/28*   (2006.01)

(52) U.S. Cl. ..................... 710/24; 710/22; 711/200; 711/202

(58) Field of Classification Search ............ 710/24
See application file for complete search history.

(56) References Cited

U.S. PATENT DOCUMENTS

| | | | | |
|---|---|---|---|---|
| 4,847,750 A | * | 7/1989 | Daniel | 710/26 |
| 5,255,374 A | * | 10/1993 | Aldereguia et al. | 710/113 |
| 5,553,307 A | * | 9/1996 | Fujii et al. | 710/25 |
| 5,659,797 A | * | 8/1997 | Zandveld et al. | 710/22 |
| 6,349,355 B1 | * | 2/2002 | Draves et al. | 711/6 |
| 6,615,292 B1 | * | 9/2003 | Sota | 710/22 |
| 6,779,085 B2 | * | 8/2004 | Chauvel | 711/135 |
| 7,287,101 B2 | * | 10/2007 | Futral et al. | 710/22 |
| 7,330,914 B2 | * | 2/2008 | Inogai | 710/22 |
| 7,334,107 B2 | * | 2/2008 | Schoinas et al. | 711/207 |

FOREIGN PATENT DOCUMENTS

JP     2001-256104     9/2001

* cited by examiner

*Primary Examiner*—Henry W. H. Tsai
*Assistant Examiner*—Michael Sun
(74) *Attorney, Agent, or Firm*—Fujitsu Patent Center

(57) ABSTRACT

A system for DMA transfer includes a DMA controller, a bus connected to the DMA controller, a bus interface connected to the bus, and a plurality of registers coupled to the bus via the bus interface, wherein the bus interface is configured to allocate the plurality of registers doubly to nonconsecutive addresses and consecutive addresses to allow the DMA controller to access the plurality of registers through the consecutive addresses.

7 Claims, 8 Drawing Sheets

SYSTEM AND METHOD FOR DMA TRANSFER

CROSS-REFERENCE TO RELATED APPLICATIONS

The present application is based upon and claims the benefit of priority from the prior Japanese Patent Application No. 2005-064358 filed on Mar. 8, 2005, with the Japanese Patent Office, the entire contents of which are incorporated herein by reference.

BACKGROUND OF THE INVENTION

1. Field of the Invention

The present invention generally relates to data transfer systems and data transfer methods, and particularly relates to a DMA transfer system and DMA transfer method.

2. Description of the Related Art

Figure 1:
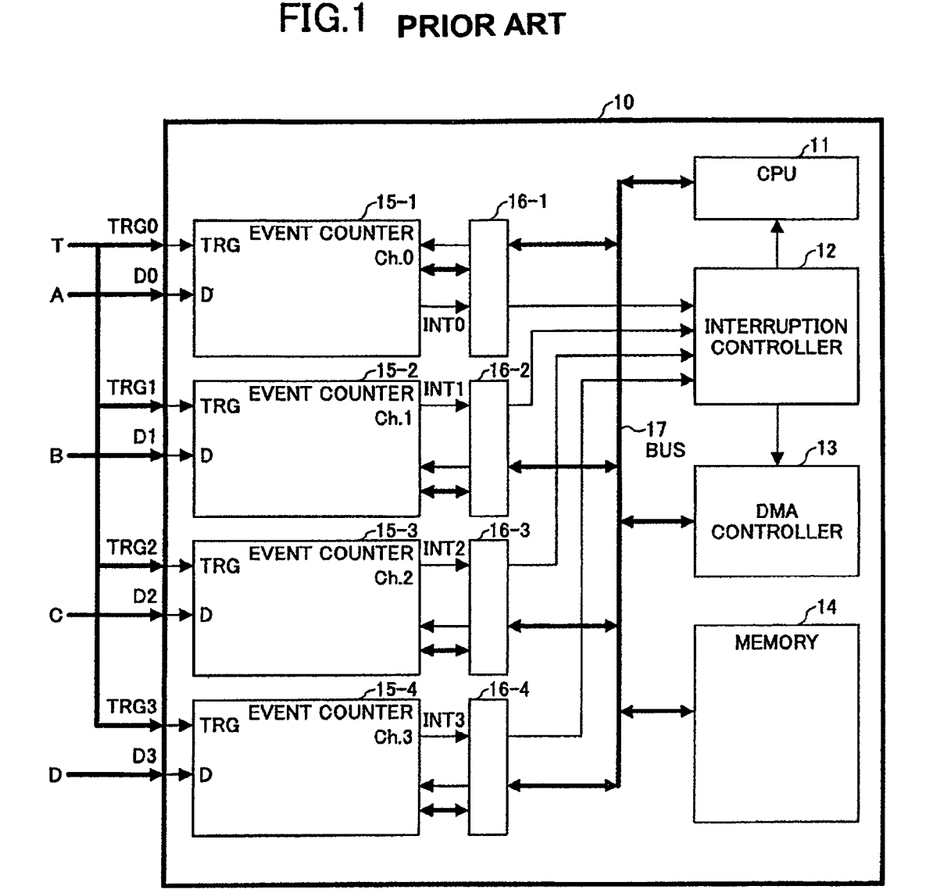
FIG. 1 is a drawing showing an example of the configuration of a related-art DMA transfer system.

A DMA (direct memory access) transfer system achieves high-speed data transfer by transferring data directly from a source to a destination without having an intervening CPU. FIG. 1 is a drawing showing an example of the configuration of a related-art DMA transfer system.

A DMA transfer system 10 shown in FIG. 1 includes a CPU 11, an interruption controller 12, a DMA controller 13, a memory 14, event counters 15-1 through 15-4, and bus interfaces 16-1 through 16-4. The CPU 11, the interruption controller 12, the DMA controller 13, and the memory 14 are coupled to each other via a bus 17. Further, the event counters 15-1 through 15-4 are coupled to the bus 17 through the respective bus interfaces 16-1 through 16-4.

The CPU 11 specifies a transfer source address, a transfer destination address, transfer data size, an increment/decrement of the transfer source address, an increment/decrement of the transfer destination address, etc., for DMA, thereby determining the settings of DMA transfer with respect to the DMA controller 13. In response, the DMA controller 13 performs the specified DMA transfer.

A description will be given below with respect to an example in which register data is transferred through DMA from the event counters 15-1 through 15-4 to the memory 14. Although the event counters are used as an example here, the operation of the DMA transfer remains the same even if macros having other functions are used.

The event counters 15-1 through 15-4 serve to count the pulses of data signals D0 through D4 during a period indicated by trigger signals TRG0 through TRG4, respectively. Namely, the event counter 15-1 starts counting the pulses of the data signal D0 when the trigger signal TRG0 becomes HIGH, and continues counting until the trigger signal TRG0 becomes LOW. When the counting comes to an end upon the change to LOW of the trigger signal TRG0, the count value is stored in an internal register of the event counter 15-1.

Upon completion of counting, the event counters 15-1 through 15-4 generate interruption signals INT0 through INT3. These interruption signals INT0 through INT3 are supplied to the interruption controller 12. In response to the interruption signals INT0 through INT3, the interruption controller 12 instructs the DMA controller 13 to start DMA transfer. In response, the DMA controller 13 performs DMA transfer.

Figure 2:
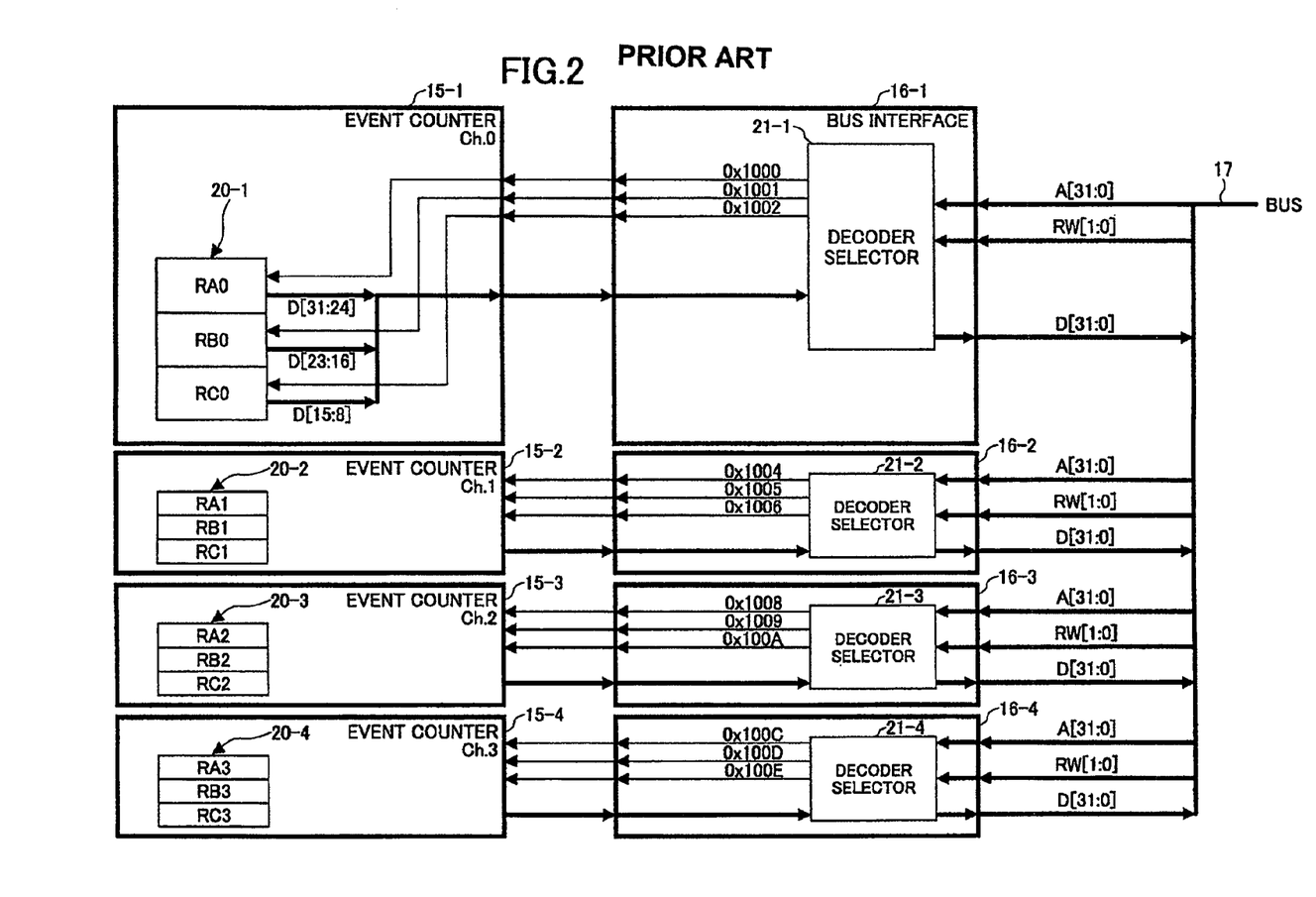
FIG. 2 is a drawing showing the detail of event counters and bus interfaces for the purpose of explaining DMA transfer operation.

FIG. 2 is a drawing showing the details of the event counters 15-1 through 15-4 and the bus interfaces 16-1 through 16-4 for the purpose of explaining DMA transfer operation. As shown in FIG. 2, the event counters 15-1 through 15-4 are provided with respective register sets 20-1 through 20-4. Further, the bus interfaces 16-1 through 16-4 include decoder selectors 21-1 through 21-4, respectively.

The register set 20-1 of the event counter 15-1 includes registers RA0, RB0, and RC0. The register set 20-2 of the event counter 15-2 includes registers RA1, RB1, and RC1. The register set 20-3 of the event counter 15-3 includes registers RA2, RB2, and RC2. The register set 20-4 of the event counter 15-4 includes registers RA3, RB3, and RC3. Each register is configured to store 8-bit data.

The bus 17 includes 32-bit address bus A[31:0], 2-bit control bus RW[1:0] for specifying write/read operation, and 32-bit data bus D[31:0]. As shown in the event counter 15-1, the data of the register RA0 corresponds to D[31:24] that represents bit 31 through bit 24 of the data bus. The data of the register RB0 corresponds to D[23:16] that represents bit 23 through bit 16 of the data bus. Further, the data of the register RC0 corresponds to D[15:8] that represents bit 15 through bit 8 of the data bus. Although illustration is omitted with respect to the event counters 15-2 through 15-4 due to the lack of space, the relationship between each of the register sets 20-2 through 20-4 and the data bus D[31:0] is the same as that of the register set 20-1.

With this configuration that assigns the registers RA0, RB0, and RC0 to the respective portions of the data bus D[31:0], it is possible to transfer all the data of the register set 20-1 at once by transferring 32-bit data on the D[31:0]. Accordingly, not only a DMA transfer that transfers 8-bit data three times, but also a DMA transfer that transfers 32-bit data only once, can be used for the purpose of transferring the data of the register set 20-1.

As shown in the event counter 15-1 and the bus interface 16-1, the registers RA0, RB0, and RC0 are allocated to addresses 0x1000, 0x1001, and 0x1002, respectively. Selecting a desired register by use of these addresses makes it possible to perform read access or write access to the selected register. By the same token, addresses 0x1004 through 0x1006 are allocated to the register set 20-2, addresses 0x1008 through 0x100A to the register set 20-3, and addresses 0x100C through 0x100E to the register set 20-4.

Figure 3:
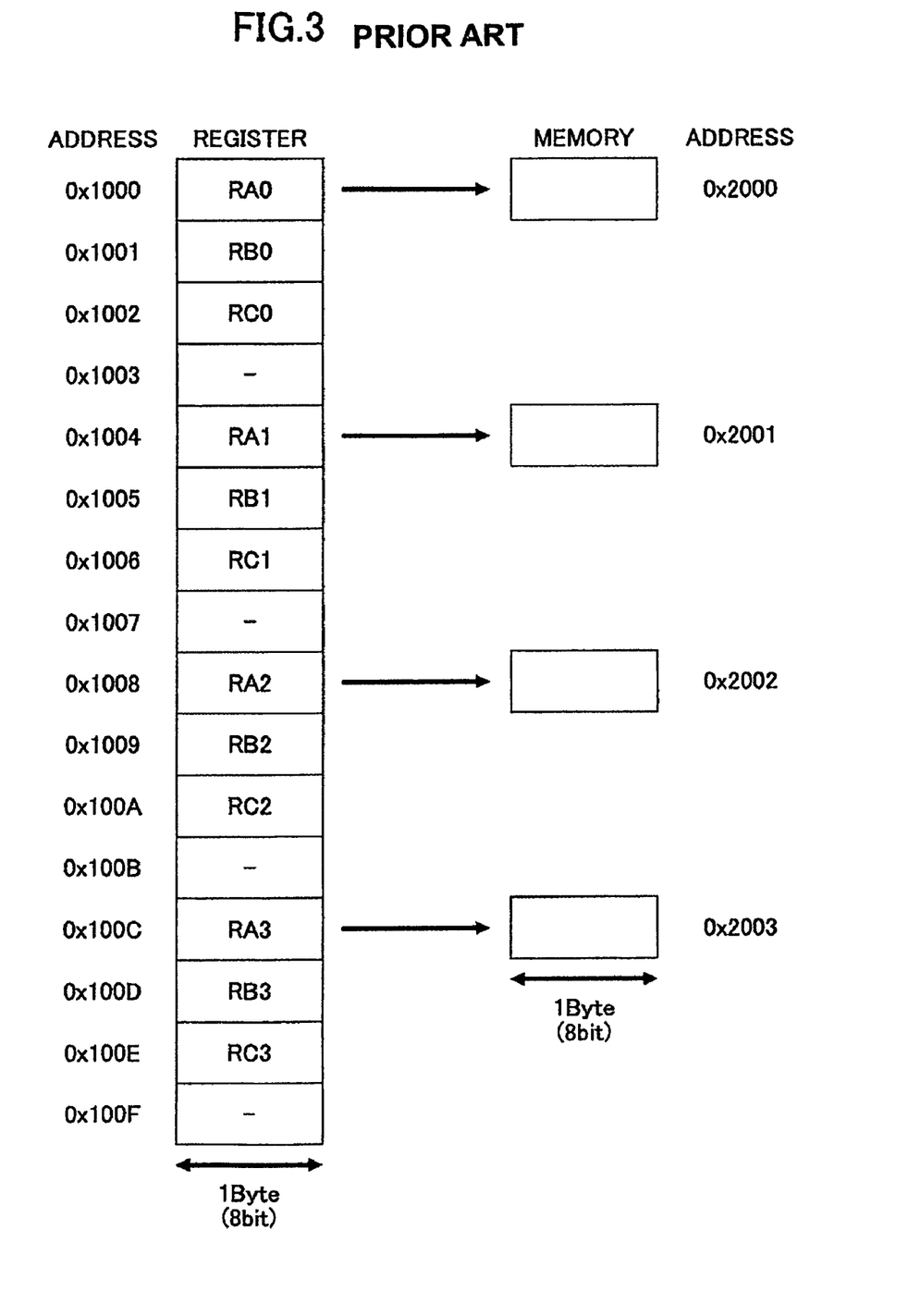
FIG. 3 is a drawing showing the allocation of registers shown in FIG. 2 to the address space.

FIG. 3 is a drawing showing the allocation of the registers shown in FIG. 2 to the address space. As shown on the left-hand side of FIG. 3, the registers RA0, RB0, and RC0 are allocated to 0x1000, 0x1001, and 0x1002, respectively, the resisters RA1, RB1, and RC1 to 0x1004, 0x1005, and 0x1006, respectively, the resisters RA2, RB2, and RC2 to 0x1008, 0x1009, and 0x100A, respectively, and the resisters RA3, RB3, and RC3 to 0x100C, 0x100D, and 0x100E, respectively. This is the same as what is already described above.

It is assumed that the count values as previously described are stored as the data indicative of the results of counting in the RA0, RA1, RA2, and RA3 of the event counters 15-1 through 15-4. A case will then be examined below in which these count values are read out and transferred to addresses 0x2000 through 0x2003 in the memory 14 (FIG. 1). In such a case, the start address of the transfer source is set to 0x1000, the data transfer width to 8 bits, and an address increment at the transfer source to +4. These settings make it possible to perform DMA transfer with respect to the count values stored in the registers. This DMA transfer is performed by transferring 8-bit data four times.

In this case, the size of transfer data is 32 bits in total. Despite the fact that the data bus D[31:0] provides a 32-bit data width, however, a single 32-bit-width DMA transfer cannot be utilized in this case. This is because the addresses of the registers RA0, RA1, RA2, and RA3 are not arranged as consecutive addresses. Even if these addresses are arranged consecutively, these registers are all allocated to the same portion D[31:24] of the data bus, so that it is impossible to perform a 32-bit-width DMA transfer.

As another example, it is assumed that the count values as described above are stored as the data indicative of the results of counting in the registers RB0, RA1, RC2, and RA3 of the event counters 15-1 through 15-4. Address increments between the registers are +3, +6, and +2 in this case. Since the address increments are not constant, the DMA transfer that transfers 8-bit data four times cannot be performed. Further, because of the same reasons as in the previous case, the DMA transfer that transfers 32-bit data once cannot be performed. That is, no DMA transfer is possible in this case.

When there is a need to transfer the data of registers that are allocated to nonconsecutive or unequal-interval addresses, conventionally, data transfer is performed by CPU-based software operations. In the case of such software-based data transfer, all the four operation steps, i.e., setting of a read address, reading of data, setting of a write address, and writing of the data, need to be performed for each transfer action. Such transfer operation is thus extremely inefficient compared with DMA transfer, failing to achieve high-speed data transfer.

As a reference, Japanese Patent Application Publication No. 2001-256104 discloses a configuration for performing efficient access to nonconsecutive addresses.

Accordingly, there is a need for a DMA transfer system which can perform efficient DMA transfer with respect to data stored in the registers that are allocated to nonconsecutive or unequal-interval addresses.

SUMMARY OF THE INVENTION

It is a general object of the present invention to provide a DMA transfer system that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a DMA transfer system particularly pointed out in the specification in such full, clear, concise, and exact terms as to enable a person having ordinary skill in the art to practice the invention.

To achieve these and other advantages in accordance with the purpose of the invention, the invention provides a system for DMA transfer which includes a DMA controller, a bus connected to the DMA controller, a bus interface connected to the bus, and a plurality of registers coupled to the bus via the bus interface, wherein the bus interface is configured to allocate the plurality of registers doubly to nonconsecutive addresses and consecutive addresses to allow the DMA controller to access the plurality of registers through the consecutive addresses.

Further, a DMA transfer method according to the present invention includes allocating to consecutive addresses a plurality of registers allocated to nonconsecutive addresses, and performing DMA transfer to transfer data of the plurality of registers to a destination from the consecutive addresses serving as source addresses.

According to at least one embodiment of the present invention, even if the resisters serving as sources of DMA transfer are not allocated to consecutive addresses, the data can be accessed as a single contiguous chunk in the address space by assigning these registers to consecutive addresses by use of mirror registers. With this provision, it is possible to perform a single DMA transfer for a single contiguous data chunk even when the registers serving as the sources of DMA transfer are not allocated to consecutive addresses.

Further, registers that have uneven address increments therebetween and thus cannot be subjected to DMA transfer may also be assigned as mirror registers to consecutive addresses. This makes it possible to set constant address increments so as to achieve DMA transfer.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 4:
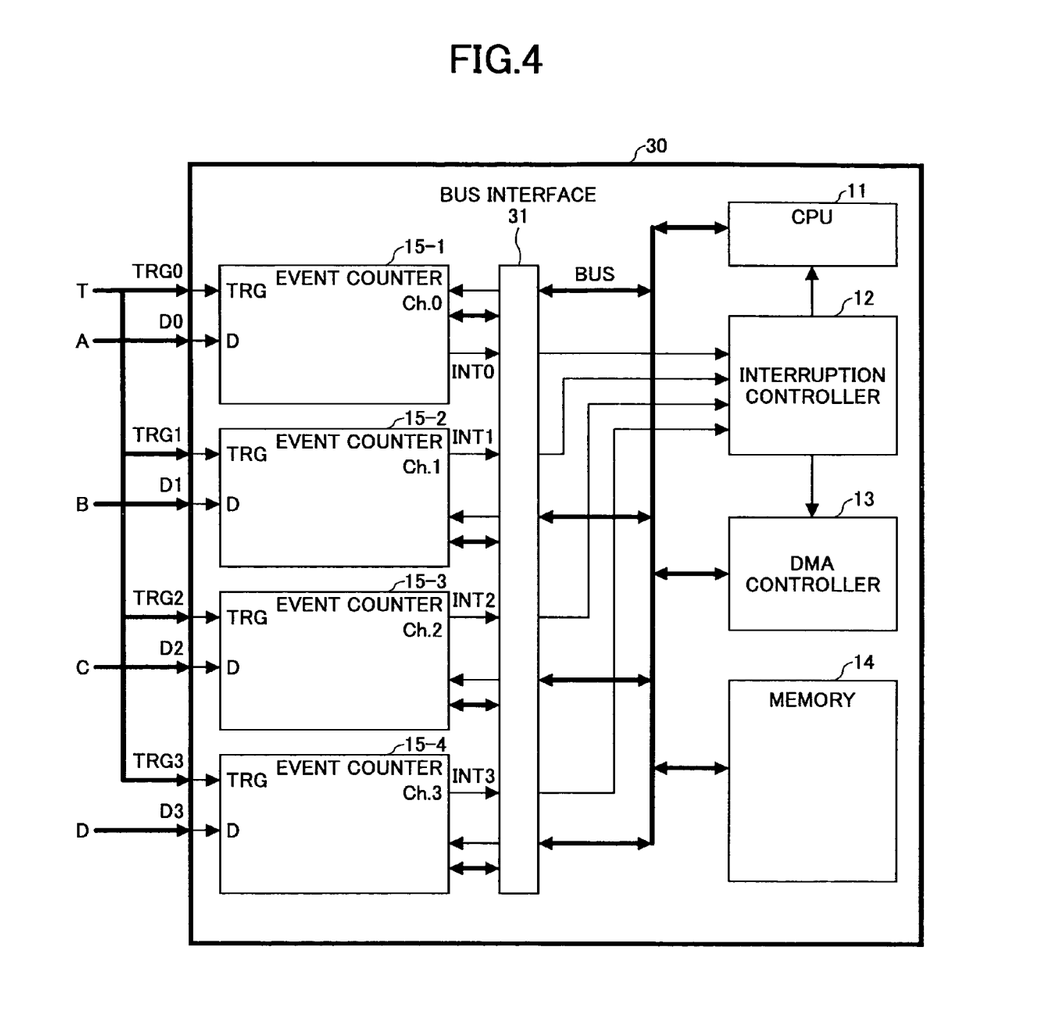
FIG. 4 is a drawing showing an example of the configuration of a DMA transfer system according to the present invention.

FIG. 4 is a drawing showing an example of the configuration of a DMA transfer system according to the present invention. In FIG. 4, the same elements as those of FIG. 1 are referred to by the same numerals.

A DMA transfer system 30 shown in FIG. 4 includes the CPU 11, the interruption controller 12, the DMA controller 13, the memory 14, the event counters 15-1 through 15-4, and a bus interface 31. The CPU 11, the interruption controller 12, the DMA controller 13, and the memory 14 are coupled to each other via the bus 17. Further, the event counters 15-1 through 15-4 are coupled to the bus 17 through the bus interface 31.

A description will be given below with respect to an example in which register data is transferred through DMA from the event counters 15-1 through 15-4 to the memory 14. Although the event counters are used as an example here, the operation of the DMA transfer remains the same even if macros having other functions are used.

The event counters 15-1 through 15-4 serve to count the pulses of data signals D0 through D4 during the period indicated by trigger signals TRG0 through TRG4, respectively. When the counting comes to an end, the count values are stored in the internal registers of the event counters 15-1 through 15-4, and the interruption signals INT0 through INT3 are generated. These interruption signals INT0 through INT3 are supplied to the interruption controller 12. In response to the interruption signals INT0 through INT3, the interruption controller 12 instructs the DMA controller 13 to start DMA transfer. In response, the DMA controller 13 performs DMA transfer.

Figure 5:
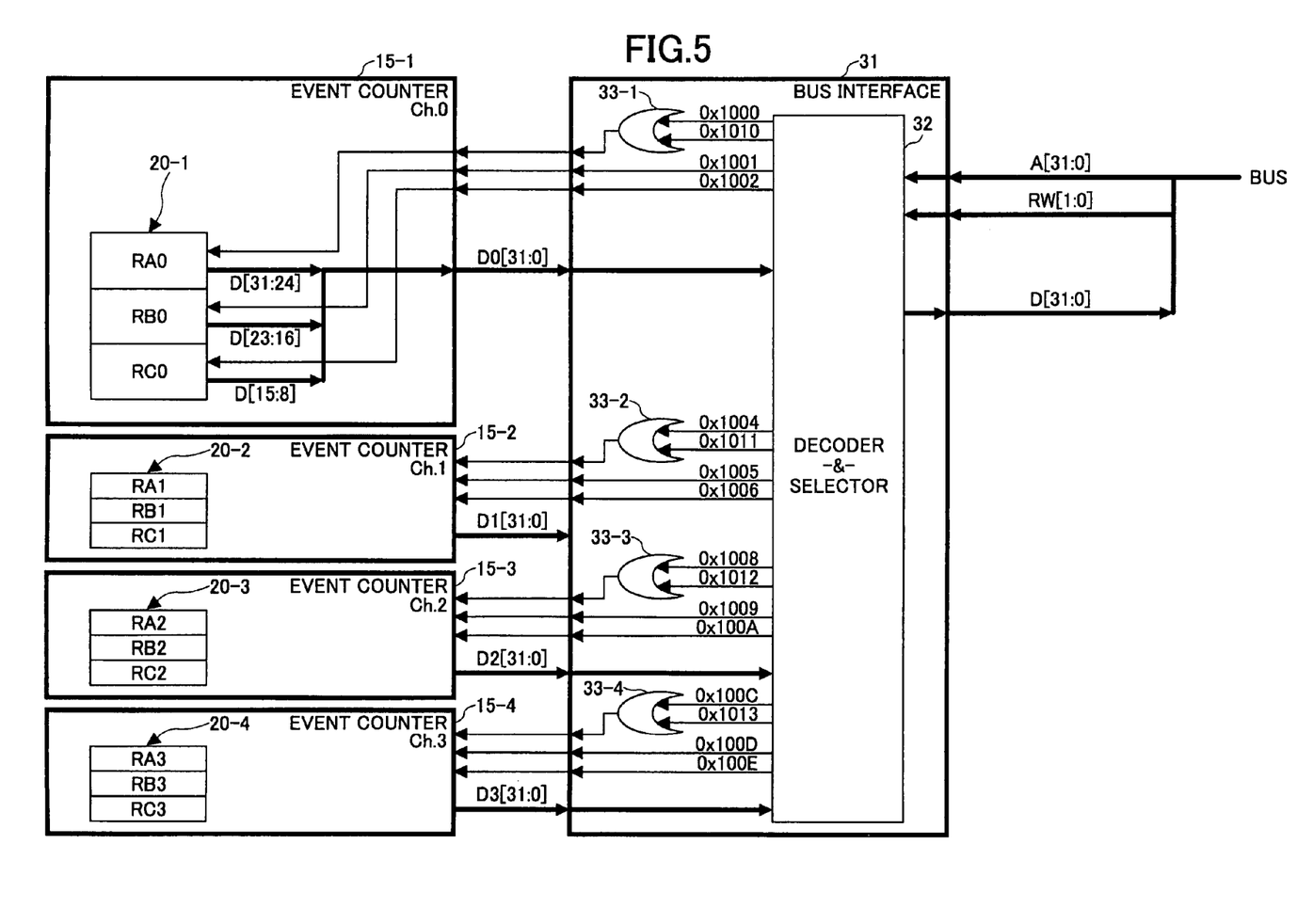
FIG. 5 is a drawing showing the detail of event counters and a bus interface for the purpose of explaining DMA transfer operation.

FIG. 5 is a drawing showing the details of the event counters 15-1 through 15-4 and the bus interface 31 for the purpose of explaining DMA transfer operation. In FIG. 5, the same elements as those of FIG. 2 are referred to by the same numerals.

As shown in FIG. 5, the event counters 15-1 through 15-4 are provided with the respective register sets 20-1 through 20-4. Further, the bus interface 31 includes a decoder-&-selector 32 and OR gates 33-1 through 33-4.

The register set 20-1 of the event counter 15-1 includes registers RA0, RB0, and RC0. The register set 20-2 of the event counter 15-2 includes registers RA1, RB1, and RC1. The register set 20-3 of the event counter 15-3 includes registers RA2, RB2, and RC2. The register set 20-4 of the event counter 15-4 includes registers RA3, RB3, and RC3. Each register is configured to store 8-bit data.

The bus 17 includes the 32-bit address bus A[31:0], the 2-bit control bus RW[1:0] for specifying write/read operation, and the 32-bit data bus D[31:0]. As shown in the event counter 15-1, the data of the register RA0 corresponds to D[31:24] that represents bit 31 through bit 24 of the data bus. The data of the register RB0 corresponds to D[23:16] that represents bit 23 through bit 16 of the data bus. Further, the data of the register RC0 corresponds to D[15:8] that represents bit 15 through bit 8 of the data bus. Although illustration is omitted with respect to the event counters 15-2 through 15-4 due to the lack of space, the relationship between each of the register sets 20-2 through 20-4 and the data bus D[31:0] is the same as that of the register set 20-1.

As shown in the event counter 15-1 and the bus interface 31, the registers RA0, RB0, and RC0 are allocated to addresses 0x1000, 0x1001, and 0x1002, respectively. When the decoder-&-selector 32 decodes the address on the address bus A[31:0] to assert a decode signal corresponding to address 0x1000, access to the register RA0 becomes possible in response to the assertion of this decode signal.

Namely, in the case of a read operation as in this DMA transfer example, the content of the register RA0 is read to the data bus D[31:24] in response to the assertion of the decode signal. If a decode signal corresponding to address 0x1001 is asserted, the content of the register RB0 is read to the data bus D[23:16] in response to this assertion. If a decode signal corresponding to address 0x1002 is asserted, the content of the register RC0 is read to the data bus D[15:8] in response to this assertion.

Further, the OR gate 33-1 provided in the bus interface 31 is configured to perform an OR operation between the decode signal corresponding to address 0x1000 output from the decoder-&-selector 32 and the decode signal corresponding to address 0x1010. A signal resulting from this OR operation is supplied to the register RA0. Accordingly, the register RA0 is allocated to address 0x1000 and also to address 0x1010. When the decoder-&-selector 32 decodes an address on the address bus A[31:0] to assert the decode signal corresponding to address 0x1010, thus, the content of the register RA0 is read out to the portion D0[31:24] of the data bus D0[31:0] between the event counter 15-1 and the bus interface 31.

The same applies in the case of the event counter 15-2. That is, the register RA1, RB1, and RC1 are allocated to addresses 0x1004, 0x1005, and 0x1006, respectively, and the OR gate 33-2 performs an OR operation between the decode signal corresponding to address 0x1004 and the decode signal corresponding to address 0x1011. A signal resulting from this OR operation is supplied to the register RA1. Accordingly, the register RA1 is allocated to address 0x1004 and also to address 0x1011. When the decoder-&-selector 32 decodes an address on the address bus A[31:0] to assert the decode signal corresponding to address 0x1011, thus, the content of the register RA1 is read out to the portion D1[31:24] of the data bus D1[31:0] between the event counter 15-2 and the bus interface 31.

The same applies in the case of the event counter 15-3. That is, the register RA2, RB2, and RC2 are allocated to addresses 0x1008, 0x1009, and 0x100A, respectively, and the OR gate 33-3 performs an OR operation between the decode signal corresponding to address 0x1008 and the decode signal corresponding to address 0x1012. A signal resulting from this OR operation is supplied to the register RA2. Accordingly, the register RA2 is allocated to address 0x1008 and also to address 0x1012. When the decoder-&-selector 32 decodes an address on the address bus A[31:0] to assert the decode signal corresponding to address 0x1012, thus, the content of the register RA2 is read out to the portion D2[31:24] of the data bus D2[31:0] between the event counter 15-3 and the bus interface 31.

The same applies in the case of the event counter 15-4. That is, the register RA3, RB3, and RC3 are allocated to addresses 0x100C, 0x100D, and 0x100E, respectively, and the OR gate 33-4 performs an OR operation between the decode signal corresponding to address 0x100C and the decode signal corresponding to address 0x1013. A signal resulting from this OR operation is supplied to the register RA3. Accordingly, the register RA3 is allocated to address 0x100C and also to address 0x1013. When the decoder-&-selector 32 decodes an address on the address bus A[31:0] to assert the decode signal corresponding to address 0x1013, thus, the content of the register RA3 is read out to the portion D3[31:24] of the data bus D3[31:0] between the event counter 15-4 and the bus interface 31.

Figure 6:
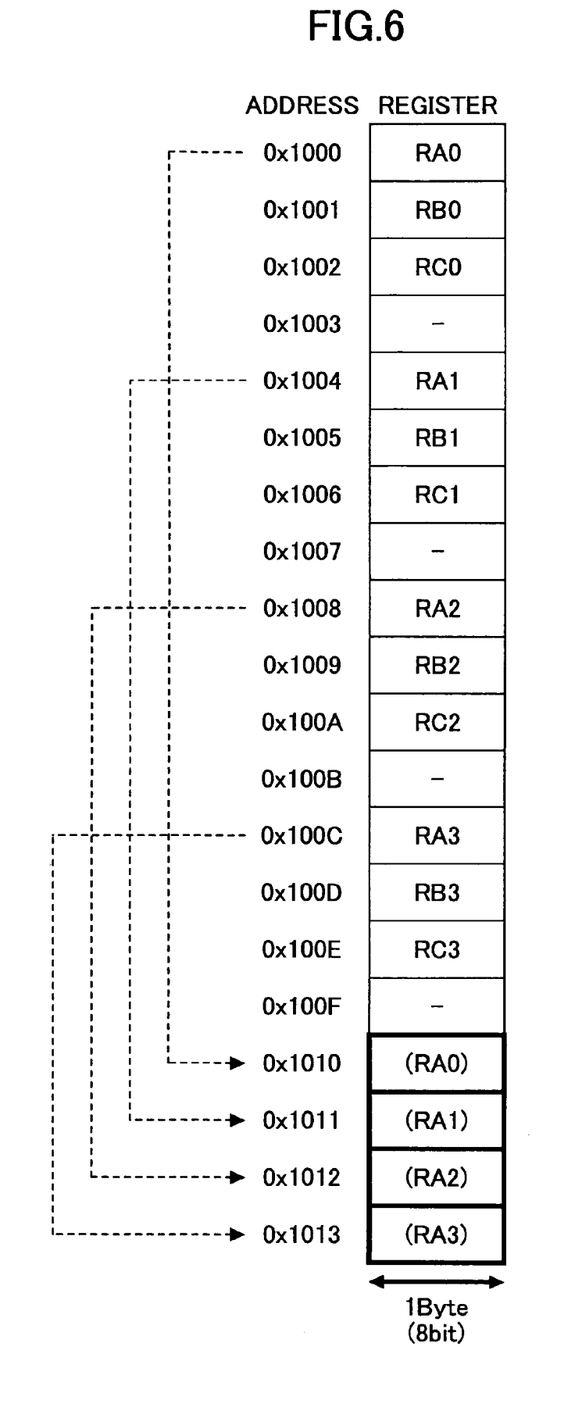
FIG. 6 is a drawing showing the allocation of registers shown in FIG. 5 to the address space.

FIG. 6 is a drawing showing the allocation of the registers shown in FIG. 5 to the address space. As shown in FIG. 6, the registers RA0, RB0, and RC0 are allocated to addresses 0x1000, 0x1001, and 0x1002, respectively, the resisters RA1, RB1, and RC1 to addresses 0x1004, 0x1005, and 0x1006, respectively, the resisters RA2, RB2, and RC2 to addresses 0x1008, 0x1009, and 0x100A, respectively, and the resisters RA3, RB3, and RC3 to addresses 0x100C, 0x100D, and 0x100E, respectively.

Based on the functions of the OR gates 33-1 through 33-4 of the bus interface 31, further, the registers RA0, RA1, RA2, and RA3 are allocated as mirror registers to addresses 0x1010, 0x1011, 0x1012, and 0x1013, respectively.

In this case, the mirror registers are allocated consecutive addresses 0x1010 through 0x1013, so that the data of these registers can be treated as 32-bit data starting at address 0x1010 in the address space. However, the registers RA0, RA1, RA2, and RA3 are all assigned to the same portion D[31:24] of the data bus, i.e., not arranged as 32-bit-width data on the data bus D[31:0]. Without any change, thus, it is not possible to perform 32-bit-width DMA transfer.

In the present invention, when the registers RA0, RA1, RA2, and RA3 are accessed as mirror registers located at addresses 0x1010 through 0x1013, the decoder-&-selector 32 shown in FIG. 5 rearranges the data read from the registers RA0, RA1, RA2, and RA3 into 32-bit data on the data bus [31:0] of the bus 17. Namely, the decoder-&-selector 32 rearranges D0[31:24], D1[31:24], D2[31:24], and D3[31:24] to make them correspond to D[31:24], D[23:16], D[15:8], and D[7:0], respectively, thereby forming 32-bit data, which is then output to the data bus of the bus 17.

Figure 7:
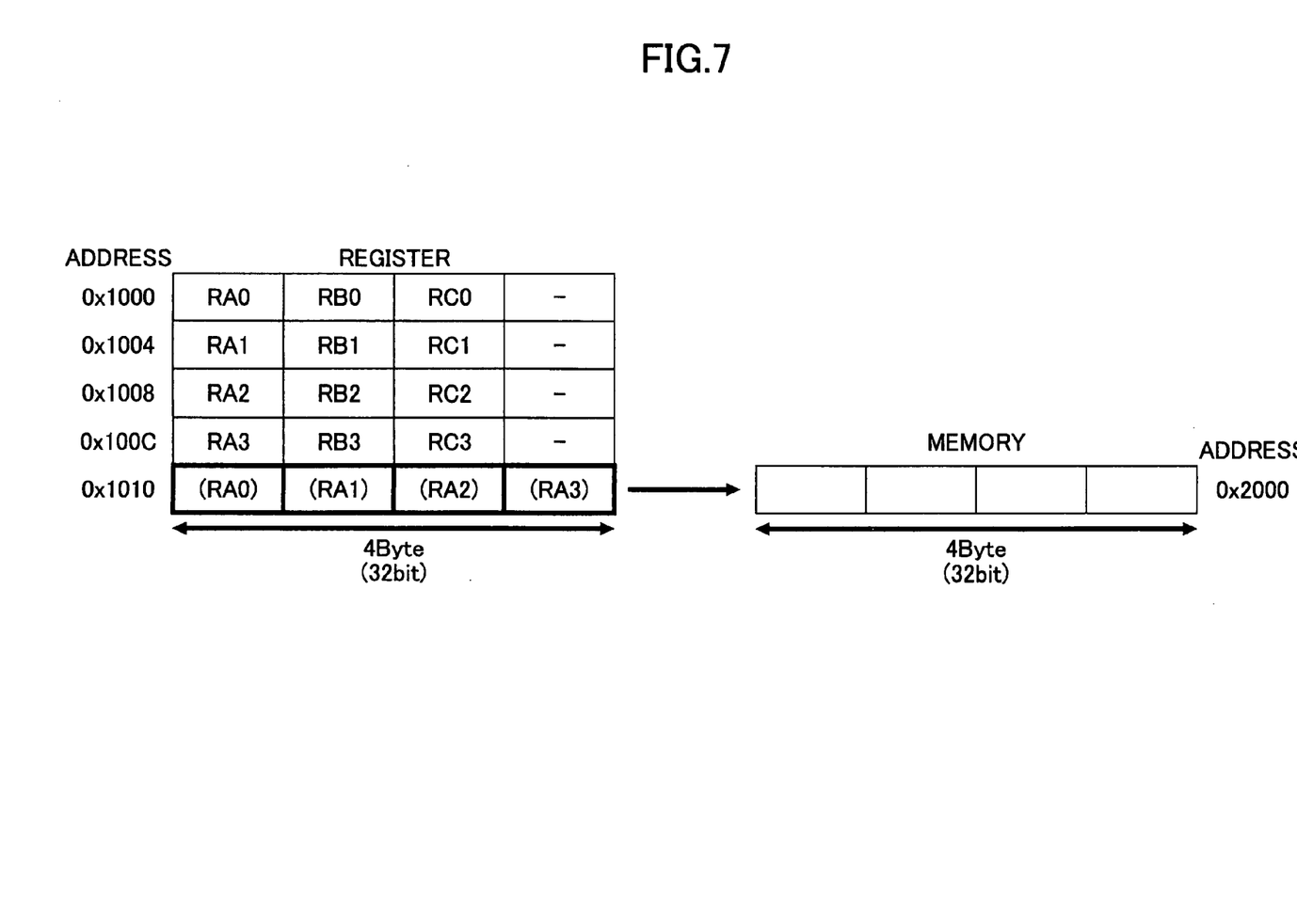
FIG. 7 is a drawing showing the 8-bit data register map of FIG. 6 as rearranged into a 32-bit register map.

FIG. 7 is a drawing showing the 8-bit data register map of FIG. 6 as rearranged into a 32-bit register map. As shown in FIG. 7, the registers RA0, RB0, and RC0 correspond to the 24 upper-order bits of the 32-bit data starting at address 0x1000.

As described above, data read from the mirror registers are rearranged by the decoder-&-selector 32 as to their positions on the data bus. As a result, the mirror registers corresponding to the registers RA0, RA1, RA2, and RA3 (shown in brackets) are assigned to every 8 bits successively from the highest-order bit as shown in FIG. 7, thereby forming 32-bit data. With this provision, it is possible to transfer the contents of the registers RA0, RA1, RA2, and RA3 to address 0x2000 of the memory 14 through a single 32-bit-width DMA transfer by treating them as 32-bit data starting at address 0x1010.

In this manner, even if the resisters serving as sources of DMA transfer are not allocated to consecutive addresses, the present invention provides for data to be accessed as a single contiguous chunk in the address space by assigning these registers to consecutive addresses by use of mirror registers. Further, the data read by accessing the mirror registers are rearranged such that the data can be transferred as a single data chunk on the data bus. With this provision, it is possible to perform a single DMA transfer for a single contiguous data chunk even when the registers serving as the sources of DMA transfer are not allocated to consecutive addresses.

As another example, it is assumed that the count values as previously described are stored as the data indicative of the results of counting in the registers RB0, RA1, RC2, and RA3 of the event counters 15-1 through 15-4. Address increments between the registers are +3, +6, and +2 in this case. Since the address increments are not constant, the DMA transfer that transfers 8-bit data four times cannot be performed.

Even in such a case, the OR gates 33-1 through 33-4 of the bus interface 31 shown in FIG. 5 may be provided for the registers RB0, RA1, RC2, and RA3, respectively, thereby assigning the registers RB0, RA1, RC2, and RA3 to addresses 0x1010, 0x1011, 0x1012, and 0x1013 as mirror registers. This makes it possible to transfer the contents of the registers RB0, RA1, RC2, and RA3 to a desired address in the memory 14 through a single 32-bit-width DMA transfer by treating them as 32-bit data starting at address 0x1010. In this manner, registers that have uneven address increments therebetween and thus cannot be subjected to DMA transfer may be assigned as mirror registers to consecutive addresses, thereby being possible to be accessed as a signal contiguous data chunk in the address space. Further, the data read by accessing the mirror registers may be rearranged such that the data can be transferred through DMA as a single data chunk on the data bus.

Figure 8:
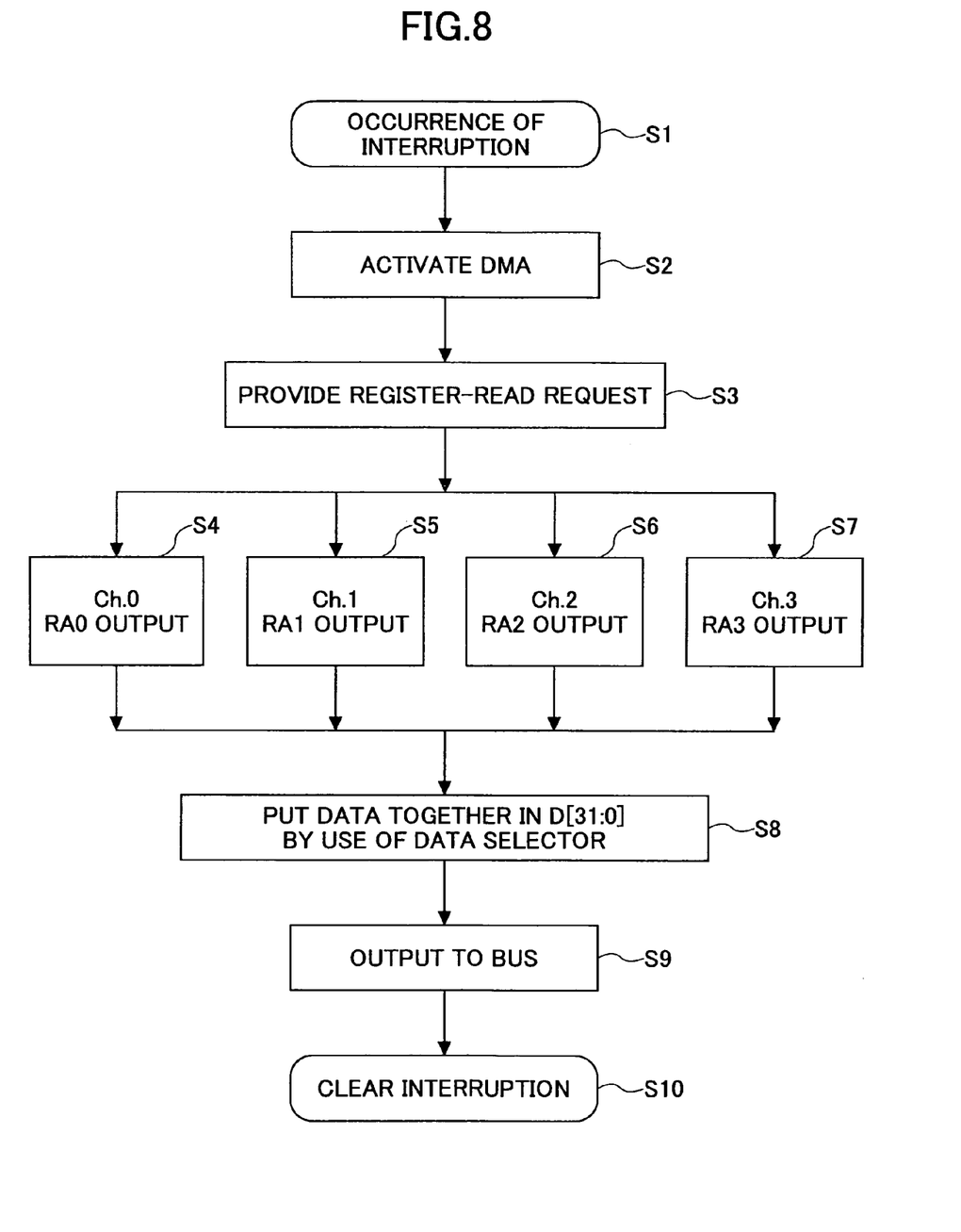
FIG. 8 is a flowchart showing a procedure for a DMA transfer process performed by the DMA transfer system of FIG. 4.

FIG. 8 is a flowchart showing a procedure for the DMA transfer process performed by the DMA transfer system 30 of FIG. 4. At step S1 of FIG. 8, an interruption occurs. This corresponds to the occurrence of interruption signals from the event counters 15-1 through 15-4. At step S2, a DMA operation is activated. That is, the interruption controller 12 requests the DMA controller 13 to activate DMA in response to the interruption signals from the event counters 15-1 through 15-4, so that the DMA controller 13 activates the DMA operation.

At step S3, the bus interface 31 supplies a register-read request to the event counters 15-1 through 15-4. Namely, in response to a request from the DMA controller 13 to read 32-bit data from a predetermined address (i.e., 0x1010 in the example of FIG. 5), the decoder-&-selector 32 of the bus interface 31 asserts address decode signals corresponding to addresses 0x1010, 0x1011, 0x1012, and 0x1013. In response to this register-read request, steps S4 through S7 are performed in parallel, so that the event counters 15-1 through 15-4 (DMA channels ch0 through ch3) outputs the data of the register RA0, the register RA1, the register RA2, and the register RA3, respectively, in parallel.

At step S8, the decoder-&-selector 32 of the bus interface 31 rearranges the data read from the register RA0, the register RA1, the register RA2, and the register RA3 into 32-bit data. At step S9, the decoder-&-selector 32 outputs the 32-bit data to the data bus D[31:0] of the bus 17. Thereafter, the DMA controller 13 performs a process that writes the data on the data bus D[31:0] to a specified address in the memory 14. At step S9, the interruption is cleared. That is, the state in which an interruption process is performed by the interruption controller 12 is brought to an end.

Further, the present invention is not limited to these embodiments, but various variations and modifications may be made without departing from the scope of the present invention.

What is claimed is:

1. A system for DMA transfer, comprising:
a DMA controller;
a bus connected to said DMA controller;
a bus interface connected to said bus; and
a plurality of registers coupled to said bus via said bus interface,
wherein said bus interface is configured to allocate said plurality of registers doubly to nonconsecutive addresses and consecutive addresses to allow said DMA controller to access said plurality of registers through the consecutive addresses, and
wherein said bus interface is configured to output to said bus a single data chunk into which respective data items of the registers read from the consecutive addresses are consolidated, said single data chunk having a first data width equal to that of said bus, and at least one of the respective data items having a second data width narrower than the first data width, and
wherein the bus interface includes:
a decoder configured to output a first decode signal in response to a first address supplied via the bus and a second decode signal in response to a second address supplied via the bus; and
an OR gate configured to perform an OR operation between the first decode signal and the second decode signal to supply a signal indicative of a result of the OR operation to one of the registers, thereby allocating both the first address and the second address to said one of the registers.

2. The system as claimed in claim 1, wherein said bus interface is configured to rearrange data of said plurality of registers read from the consecutive addresses as to positions of the data on said bus.

3. The system as claimed in claim 1, wherein the nonconsecutive addresses have uneven intervals.

4. The system as claimed in claim 1, wherein said plurality of registers is distributed as internal registers located in two or more macros.

5. The system as claimed in claim 4, wherein another internal register located in the two or more macros is allocated to an address intervening between the nonconsecutive addresses.

6. A DMA transfer method, comprising:
allocating to consecutive addresses a plurality of registers allocated to nonconsecutive addresses; and performing DMA transfer to transfer data of the plurality of registers to a destination from the consecutive addresses serving as source addresses, wherein said DMA transfer transfers on a bus a single data chunk into which respective data items of the registers read from the consecutive addresses are consolidated, said single data chunk having a first data width equal to that of said bus, and at least one of the respective data items having a second data width narrower than the first data width, and wherein said step of allocating includes:

outputting, from a decoder, a first decode signal in response to a first address supplied via an address bus and a second decode signal in response to a second address supplied via an address bus; and performing, by an OR gate, an OR operation between the first decode signal and the second decode signal to supply a signal indicative of a result of the OR operation to one of the registers, thereby allocating both the first address and the second address to said one of the registers.

7. The DMA transfer method as claimed in claim 6, further comprising rearranging data of the plurality registers read from the consecutive addresses serving as the source addresses so as to change positions of the data on said bus.

* * * * *

UNITED STATES PATENT AND TRADEMARK OFFICE
CERTIFICATE OF CORRECTION

PATENT NO.         : 7,634,593 B2                                     Page 1 of 1
APPLICATION NO. : 11/165244
DATED              : December 15, 2009
INVENTOR(S)        : Seiji Suetake It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this

Ninth Day of November, 2010

David J. Kappos
*Director of the United States Patent and Trademark Office*